Nov. 29, 1966   F. C. MILLER ETAL   3,288,101
RAILROAD CABOOSE CAR WARNING SIGNAL
Filed Sept. 15, 1964   2 Sheets-Sheet 1
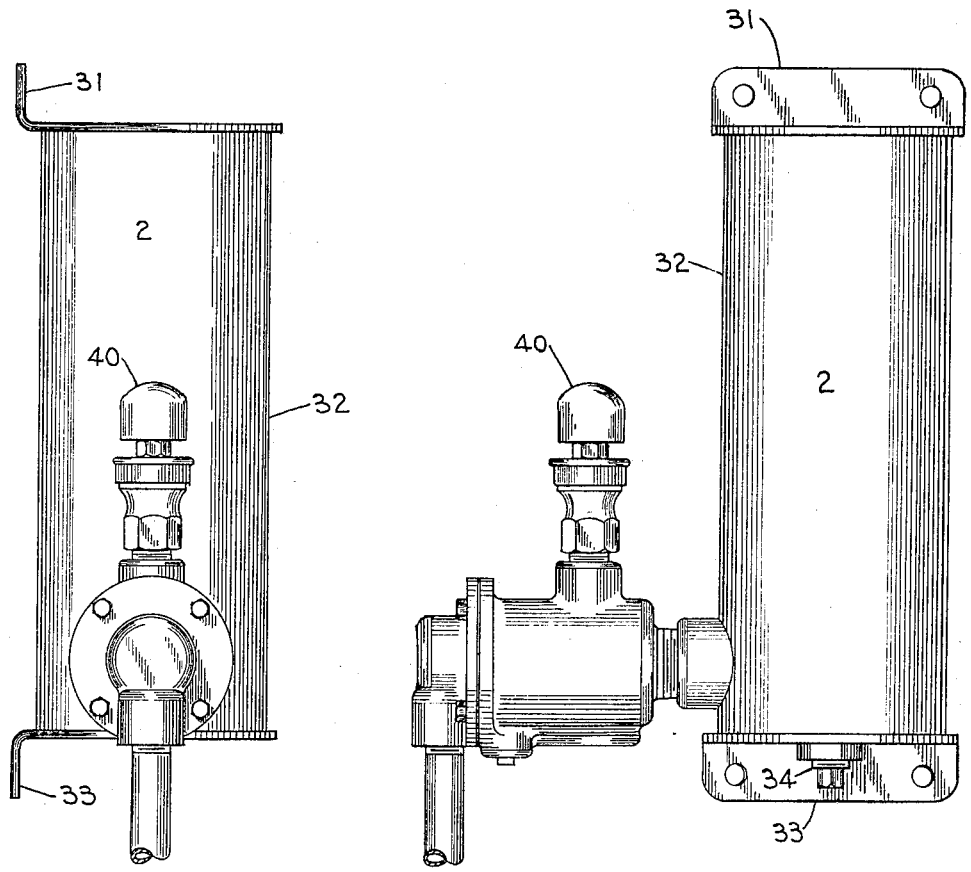
FIG. I
FIG. II
INVENTORS
FRANK C. MILLER
WILLIAM B. TANNER

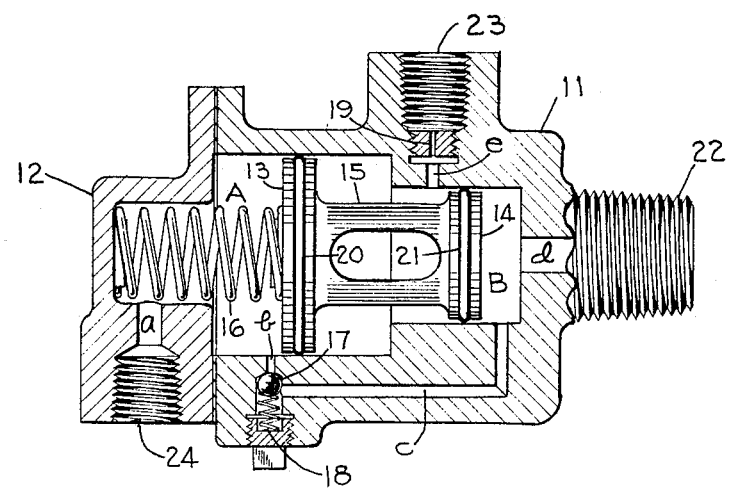
FIG. III
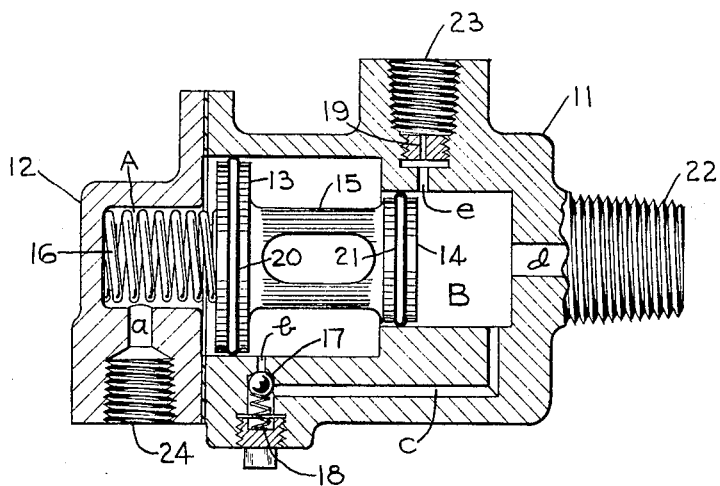
FIG. IV
INVENTORS
FRANK C. MILLER
WILLIAM B. TANNER

United States Patent Office 3,288,101
Patented Nov. 29, 1966

3,288,101
RAILROAD CABOOSE CAR WARNING SIGNAL
Frank C. Miller, 2752 Meadowview Drive NW., Roanoke, Va., and William B. Tanner, 5409 Berry Hill Road, Norfolk, Va.
Filed Sept. 15, 1964, Ser. No. 396,766
1 Claim. (Cl. 116—55)

Summary

The railroad caboose car warning signal is a device for sounding an alarm whistle a few seconds before an emergency air brake application takes place, thereby warning the crewmen riding in the caboose car or camp car at the rear end of long trains of the impending slack action due to emergency application of the air brakes and permitting them to prepare by sitting down or holding on to interior handholds, or otherwise brace themselves to prevent being injured when full brake force takes hold.

The railroad caboose car warning signal consists of an actuating valve, an air reservoir, and, a warning whistle. The device will, of course, be located inside the caboose or camp car where the warning can be heard by the men in attendance. As the air brake trainline pipe (called brake pipe) is charged, the actuating valve permits charging of the air reservoir. When brake pipe pressure reaches a maximum, the actuating valve captures and holds air pressure in the reservoir slightly less than brake pipe pressure. Thereafter, the pressure in the reservoir remains constant regardless of changes in brake pipe pressure. However, should brake pipe pressure increase above some previous maximum (for example, by correcting a leak somewhere in the trainline) the reservoir pressure will increase accordingly, thereby always providing maximum available pressure with which to sound the warning whistle. When brake pipe air pressure drops rapidly to zero, as when an emergency application of the air brakes is initiated, the actuating valve functions to exhaust air from the reservoir through the whistle to sound a warning. Once the reservoir is exhausted the actuating valve functions to permit charging the reservoir as soon as brake pipe air pressure is re-established.

Description of drawings

The railroad caboose car warning signal device which is described in these specifications and shown on the accompanying drawings consists of an actuating valve, an air reservoir, and a warning whistle.

FIGURES I and II show the arrangement of the above parts. FIGURE III is a section of the actuating valve showing the pistons in normal position. FIGURE IV is a section of the actuating valve showing the pistons in the actuated or warning position. Numbers 11 through 24 indicate the parts of the actuating valve. Capital letters indicate chambers of the valve and small letters indicate passageways.

Detailed description

When an emergency brake application is initiated by the locomotive engineman at the head of the train, local brake pipe air pressure is reduced at emergency rate; in other words, suddenly reduced to zero. It takes a number of seconds for brake pipe air pressure to be reduced to zero at the rear end of the train. When brake pipe air pressure on each car is reduced at emergency rate, emergency application of the brakes is initiated on that car. There are several seconds' time lapse between the reduction of brake pipe pressure to zero and the beginning of brake cylinder pressure build-up on the car. The rate of propagation from car to car is approximately 990 ft. per second. Hence, on trains 100 or more cars long, brakes near the front of the train are applied by the time the emergency application is started on the last car (the caboose). This is what causes slack to run in and many times the impact is severe depending on a number of things such as train speed, loaded or empty cars, train length, etc. Crewmen who ride the rear most car of trains are subject to being jostled and thrown about by slack action. Usually, when injury occurs, the crewmen are busy, caught in a standing position, and are not at the moment looking at the caboose gauge which registers brake pipe air pressure. The slack action has been known to throw crewmen to the floor, or against the interior, breaking ribs, arms and causing internal injuries. Railroads pay out a considerable sum each year on claims because of such injuries.

The railroad caboose car warning signal takes advantage of the several seconds' time between reduction of brake pipe pressure to zero and the beginning of brake cylinder pressure build-up to sound a warning whistle. The actuating valve is so designed that ordinary brake applications do not actuate it to blow the warning whistle. To do so would be an annoyance to the crewmen, also they would become so accustomed to hearing the whistle that its value as a warning device would be lost. The device described in this specification functions independent of any other brake component. It works entirely on an independent charge of brake pipe air, and is actuated only when desirable; that is in an emergency application of the air brakes of the train. Thus, failure of this device to function will have no effect on the functioning of the air brake systems of the car or train.

The railroad caboose car warning signal consists of an actuating valve, an air reservoir and a warning whistle. The actuating valve is made up of valve body 11; valve end cover 12; a piston assembly consisting of large piston 13; small piston 14 connected together by stem 15; piston spring 16; ball check 17; ball check spring 18; whistle choke 19; O rings 20 and 21; threaded male reservoir connection 22; threaded female whistle connection 23; threaded female brake pipe connection 24.

Air reservoir assembly 2 in FIGURES I and II consists of cylindrical section 32; closed at each end by brackets 31 and 33; drain and clean-out plug 34.

Warning whistle 40 is a common bell type requiring no detailed description.

Brake pipe air enters the actuating valve through passageway a, into chamber A, FIG. III. Piston spring 16 and air in chamber A force the piston assembly (piston 13 and piston 14, joined by stem 15) to the right, permitting air to enter passageway b. As pressure builds up, ball check 17, held on its seat by spring 18, is unseated, permitting air to enter chamber B by way of passageway c, then to air reservoir 2 via passageway d. When brake pipe air reaches a maximum pressure, ball check 17 seats again, holding the air in the reservoir. The size of large piston 13, small piston 14, and force of spring 16 are so related that reductions in brake pipe pressure due to normal applications of the brake effect no movement of the pistons. As soon as brake pipe pressure is reduced to a predetermined low pressure (for example 20 p.s.i.) which would never be obtained except in an emergency reduction, or in event of some malfunction, the piston assembly is forced to the left by the high air pressure in the reservoir. This communicates chamber B with passageway e and permits high pressure air to blow through choke 19 to blow warning whistle 40, sounding an alarm. When the air from reservoir 2 is depleted, piston spring 16 moves the piston assembly back to normal charging position, ready to repeat if need be.

We claim:
A signal device for connection in a fluid pressure line containing a normal relatively high pressure and which is actuated by a sudden rapid loss of pressure in said line, said device comprising a fluid reservoir, a fluid actuated whistle means, and an actuating valve, said actuating valve including a valve body having an elongated bore, the bore having a first portion of one diameter and a second portion of a second substantially smaller diameter, first end closure means for the first portion of said bore and second end closure means for the second portion of the bore, a piston assembly including a first piston head of large diameter and an interconnected second piston head of smaller diameter, said first piston head being slidably mounted in said first portion and said second piston head being slidably mounted in said second portion, said first end closure means and said valve body and said first piston head forming a first chamber, said first piston head and said valve body and said second piston head forming a second chamber, said second piston head and said valve body and said second end closure means forming a third chamber, passage means extending through said body from said first chamber to said third chamber in fluid flow communication when said piston assembly is in its non-alarm position, check valve means disposed in said passage means permitting flow of fluid from said first chamber to said third chamber but blocking fluid flow in the opposite direction, said first closure means includes a thickened cover having an internal cavity in communication with said first chamber, spring means extending from said cavity into said first chamber to engage said first piston head for urging said piston assembly to its non-alarm position, passage means connecting said first chamber to said fluid pressure line in fluid flow communication, means connecting said third chamber to said fluid reservoir in fluid flow communication, means connecting said second chamber in fluid communication with atmosphere when said piston assembly is in its non-alarm position, and means connecting said third chamber to said fluid actuated whistle means in fluid flow communication only when said piston assembly is in its alarm position.

References Cited by the Examiner

UNITED STATES PATENTS

| | | | |
|---|---|---|---|
| 1,083,351 | 1/1914 | Down | 116—55 |
| 1,710,054 | 4/1929 | Grant | 116—55 |
| 1,803,808 | 5/1931 | Platt | 116—55 |
| 1,885,363 | 11/1932 | Leitner | 116—55 |
| 1,910,513 | 5/1933 | Yancey | 116—55 |
| 2,379,308 | 6/1945 | McClure | 303—85 |
| 2,570,154 | 10/1951 | Prendugast | 116—55 |
| 2,855,247 | 10/1958 | Thompson | 303—86 |

LOUIS J. CAPOZI, *Primary Examiner.*